United States Patent
Meyer et al.

(10) Patent No.: US 8,685,520 B2
(45) Date of Patent: Apr. 1, 2014

(54) HEIGHT TAILORING OF INTERFACING PROJECTIONS

(75) Inventors: Jonathan Meyer, Bristol (GB); Daniel Johns, Bristol (GB)

(73) Assignee: Airbus Operations Limited, Bristol (GB)

(*) Notice: Subject to any disclaimer, the term of this patent is extended or adjusted under 35 U.S.C. 154(b) by 398 days.

(21) Appl. No.: 12/729,709

(22) Filed: Mar. 23, 2010

(65) Prior Publication Data

US 2010/0247869 A1 Sep. 30, 2010

(30) Foreign Application Priority Data

Mar. 25, 2009 (GB) .................................. 0905134.3

(51) Int. Cl.
  *B32B 3/30* (2006.01)
  *B29C 65/48* (2006.01)
  *B29C 65/56* (2006.01)

(52) U.S. Cl.
  USPC ............................... 428/99; 428/98; 428/223

(58) Field of Classification Search
  USPC .............................................. 428/99, 98, 223
  See application file for complete search history.

(56) References Cited

U.S. PATENT DOCUMENTS

| | | | | |
|---|---|---|---|---|
| 3,485,518 A | * | 12/1969 | Heise | 403/283 |
| 5,766,277 A | * | 6/1998 | DeVoe et al. | 51/295 |
| 2002/0076275 A1 | | 6/2002 | Hernandez et al. | |
| 2008/0206509 A1 | * | 8/2008 | Kent et al. | 428/67 |

FOREIGN PATENT DOCUMENTS

| WO | 2004/028731 A1 | 4/2004 |
|---|---|---|
| WO | 2008/110835 A1 | 9/2008 |

OTHER PUBLICATIONS

British Search Report for GB0905134.3 dated Jun. 18, 2009.

* cited by examiner

*Primary Examiner* — Brent O'Hern
(74) *Attorney, Agent, or Firm* — Lowe Hauptman & Ham, LLP

(57) ABSTRACT

A method of joining a first component to a second component, the method comprising forming an array of projections extending from a bond surface of the first component, the projections having a plurality of different profiles; and embedding the array of projections in the second component formed of a plurality of laminate plies, wherein each projection profile is adapted to best transfer load into a respective one of the laminate plies. The resultant joint is able to transfer load more progressively between the two components leading to improved tensile strength.

31 Claims, 8 Drawing Sheets

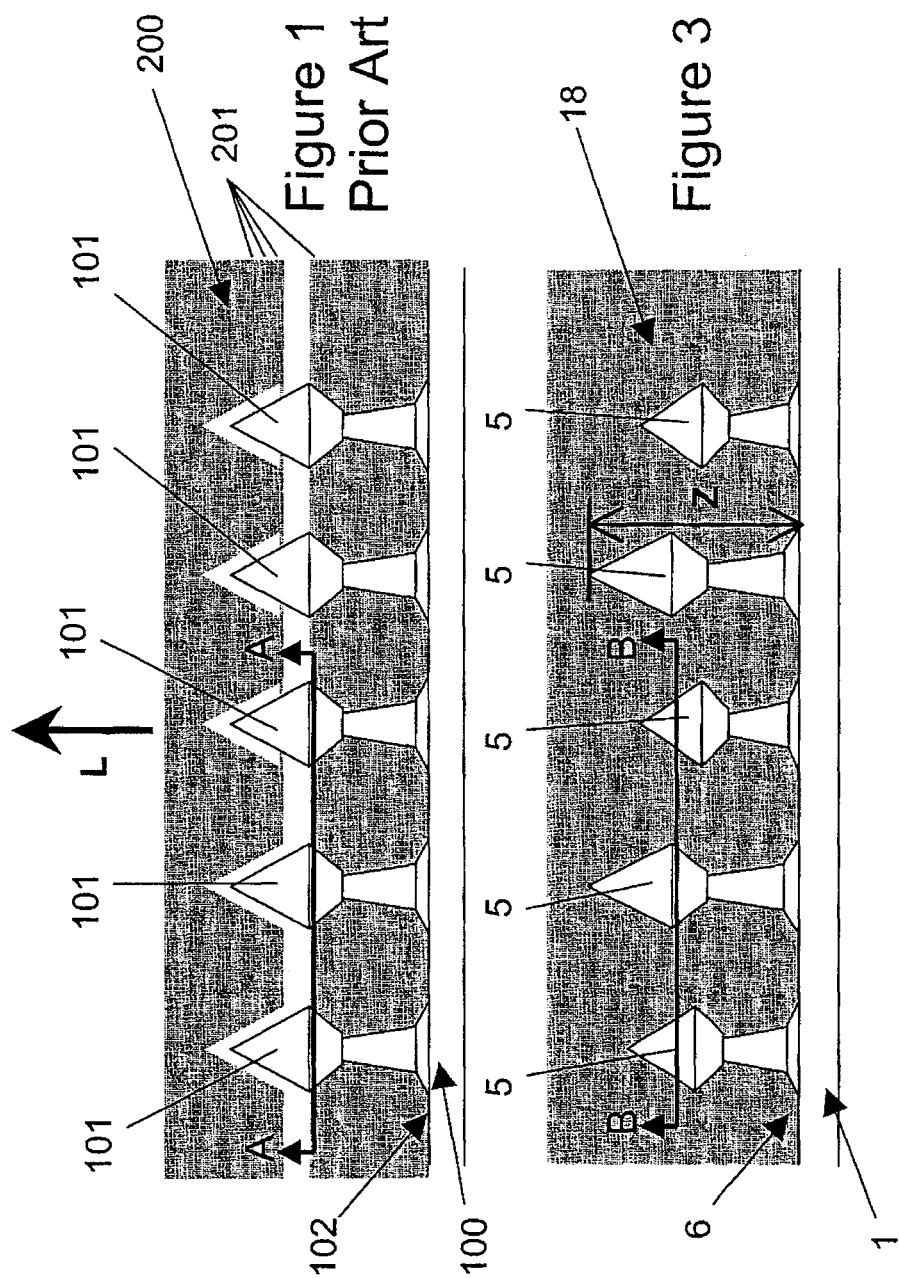

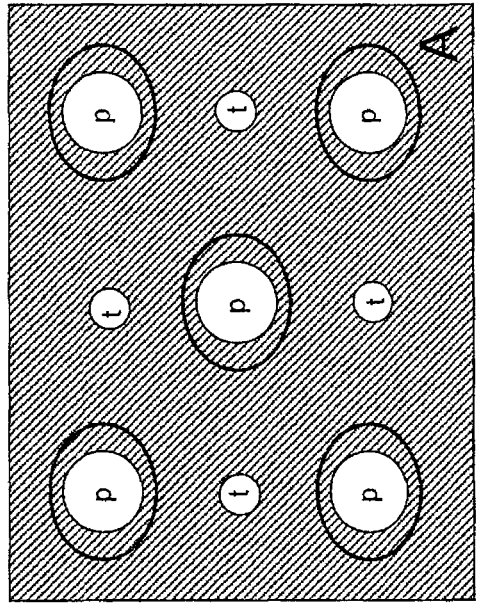
Figure 4a  section B-B
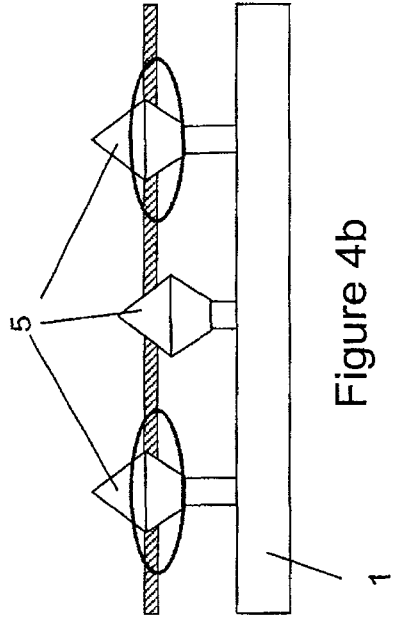
Figure 4b
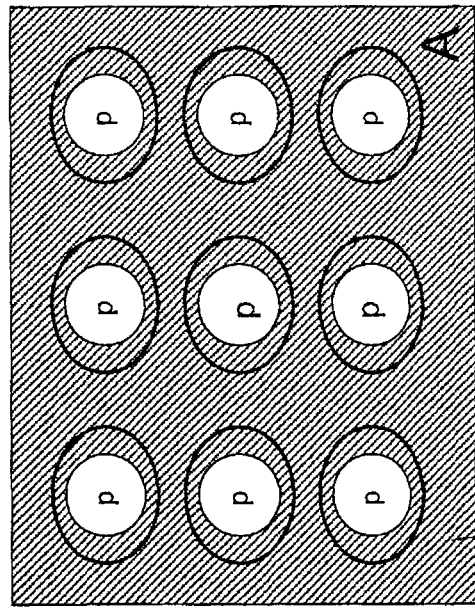
Figure 2a
Prior Art  section A-A
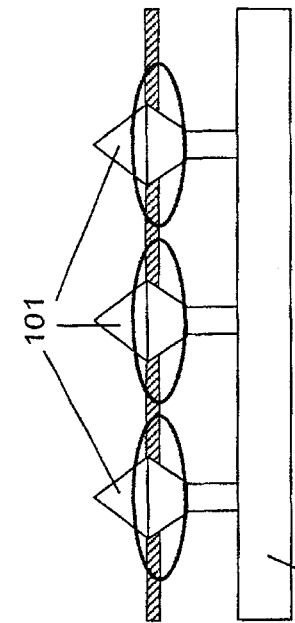
Figure 2b
Prior Art

HEIGHT TAILORING OF INTERFACING PROJECTIONS

RELATED APPLICATIONS

The present application is based on, and claims priority from, British Application Number GB0905134.3, filed Mar. 25, 2009, the disclosure of which is hereby incorporated by reference herein in its entirety.

FIELD OF THE INVENTION

The present invention relates to a method of joining a first component to a second component, and to a joint so formed.

BACKGROUND OF THE INVENTION

Joining between metallic or thermoplastic and composite components is currently approached in a number of ways, each with its own limitations.

The use of fasteners is commonplace but tends to result in de-lamination around fastener holes. Fastener holes are often difficult to drill in composites and significant reinforcement around fastener holes may be required, leading to increased weight. Fastened joints tend to be particularly weak in the pull-off direction (that is, the direction of axial load through the fastener). As such, fastened joints are not well suited to many aerospace applications.

Adhesive bonds are an increasingly common means of joining metallic components to composite laminates, however these perform poorly in peel, tension and cleavage, and tend to fail with little or no warning. Their weakness in peel and in tension makes bonded joints similarly limited in their application within conventional aerospace structures. Any mitigation for the poor performance in peel or tension tends to result in large bond surface areas, with the associated weight penalties that go with this.

WO 2004/028731 A1 describes a method by which surface features are generated by using a 'power-beam' such as an electron beam, in order to 'flick-up' surface material on a metallic component to sculpt protruding features that are intended to increase bond surface area and improve bond strength when incorporated into the matrix of a co-cured laminate. The displacement of surface material to create the protruding features is likely to generate crack initiators that will adversely affect the fatigue life of the component. Also, it is difficult to optimise the profile and shape of the surface features.

WO 2008/110835 A1 describes a method by which surface features are "grown" on a bond surface of a component in a series of layers by an additive fabrication process. The profile and shape of the surface features can be controlled so as to tailor the performance of the joint, particularly in tension and peel. Each surface feature may have a pointed tip such that the surface features may easily be embedded into a series of laminate plies draped successively over the bond surface.

SUMMARY OF THE INVENTION

A first aspect of the invention provides a method of joining a first component to a second component, the method comprising forming an array of projections extending from a bond surface of the first component, the projections having a plurality of different profiles; and embedding the array of projections in the second component formed of a plurality of laminate plies, wherein each projection profile is adapted to best transfer load into a respective one of the laminate plies.

A second aspect of the invention provides a joint between a first component and a second component, the first component having an array of projections formed extending from a bond surface thereof, the projections having a plurality of different profiles, and the second component comprising a plurality of laminate plies, wherein the array of projections are embedded in the second component, and wherein each projection profile is adapted to best transfer load into a respective one of the laminate plies.

The joint is advantageous in that axial load in the projections is more progressively transferred into the laminate of the second component. This improves the "pull-off" tensile strength of the joint in the direction normal to the bond surface. In prior art joints where the array of identical projections are closely packed, the dominant failure mode in the pull-off tensile direction can be a net section failure of the laminate (i.e. de-lamination of the plies) in a stress concentration region around the projections. By varying the profiles of the projections in the array, the load can be transferred into a greater number of the laminate plies of the second component, so reducing these stress concentrations and improving the tensile strength of the joint.

In one embodiment, the projection profiles are varied by changing the height of their overhanging edge(s) with respect to the bond surface such that the overhanging edges engage with different plies in the stack. The region around the overhanging edges transfers the majority of the "pull-off" load from the first component into the plies of the second component. By changing the height of these overhanging edges, the loads transferred into individual plies may be controlled, and so the tensile strength of the joint can be improved.

In another embodiment, the projection profiles are varied by changing the overall height of the projections with respect to the bond surface such that the projections engage with different plies in the stack. By changing the height of the projections, the loads transferred into individual plies may be controlled, and so the tensile strength of the joint can be improved.

In a preferred embodiment, the projection profiles are scalable only in the axial direction of the projections and so the projections are all of similar average width dimension. Therefore, the projections in the array have variable aspect ratio (i.e. the ratio of the projection height to its base area). The aspect ratio influences the stiffness of the projection and typically varies between approximately 2 and 6. In this way, the projection profiles can be varied by changing both the height of the overhanging edge(s), and the overall height, of the projections.

The projections may be arranged such that some adjacent projections have the same, or different, profiles. The projections may be arranged in groups including projections of different profiles such that the groups form a repeating profile pattern in the array.

Each projection may be rotationally symmetric about its centreline. Preferably, each projection has a frustoconical base, a conical tip and an inverted frustoconical overhang between the base and the tip. Regardless of the rotational symmetry of the projections, they preferably have a pointed tip to improve the ease of embedding the projections into the second component, and an overhang to enhance the pull-off (tensile) strength of the joint. The projections may have a linear or curved centreline, which may be normal or form an oblique angle at its intersection with the bond surface.

Preferably, the projections are grown on the bond surface in a series of layers, each layer being grown by directing energy and/or material to the bond surface. Suitable additive fabrication techniques may be a "powder bed" process (in which a series of layers of powder are deposited on the bond region and selected parts of each bed are fused by a power beam) or "powder feed" process (in which a directed stream of powder is deposited on selected parts of the bond region and then fused by a power beam, such as a laser or electron beam). Alternatively the projections may be formed by friction welding a set of projections onto the bond surface. Yet further, the projections may be formed by fused deposition modelling (in which hot plastic is extruded through a nozzle).

The first component may be formed from a metallic material (such as Titanium or stainless steel); a thermoplastic material such as polyetheretherketone (PEEK); or any other suitable material. The second component may include fibre reinforced composite laminate plies.

The projections of the first component are preferably embedded into the second component by draping successive laminate plies which will form the second component over the first component. The draping may be performed manually or a computer controlled tape laying machine may be used. A soft roller may be required to adequately embed the projections of the first component in the appropriate plies of the second component. The first component may be set in a mould tool over which the layers are draped. Alternatively, the first component may be rolled, or otherwise moved, over one or more of the plies so as to embed the projections in the plies.

Each laminate ply of the second component may be laid up as dry fibre plies to which resin is infused after the projections are embedded. Alternatively, the fibre plies may be pre-impregnated with the resin, a so-called "pre-preg", in which the projections are embedded. After embedding the projections in the plies and infusing resin, if necessary, the fibre reinforced composite plies may need to be cured. The composite plies may be, for example, carbon fibre reinforced plastic (CFRP), glass fibre reinforced plastic (GFRP), or Aramids such as Kevlar.

Preferably, the second component is co-cured with the first component after the projections of the first component are embedded in the second component. Each ply of the second component may be cured separately on the first component, or curing may be performed after a batch, or all, of the plies of the second component have been laid up on the first component.

The projections may be formed from the same material as the first component, or they may be formed from a different material.

The joint may be used to join structural components, for instance in an aerospace application. For instance the joint may be used to join a reinforcing plate, floating rib foot, or stringer to a panel such as a wing or fuselage cover.

BRIEF DESCRIPTION OF THE DRAWINGS

Embodiments of the invention will now be described with reference to the accompanying drawings, in which:

FIG. 1 illustrates a cross section view of inter-laminar failure in a prior art hybrid joint having an array of identical interfacing projections;

FIGS. 2a and 2b illustrates partial cross section views of the hybrid joint of FIG. 1;

FIG. 3 illustrates a cross section view of a hybrid joint according to a first embodiment of the present invention having an array of interfacing projections of different profiles;

FIGS. 4a and 4b illustrate partial cross section views of the hybrid joint of FIG. 3;

DETAILED DESCRIPTION OF EMBODIMENT(S)

Figure 5:
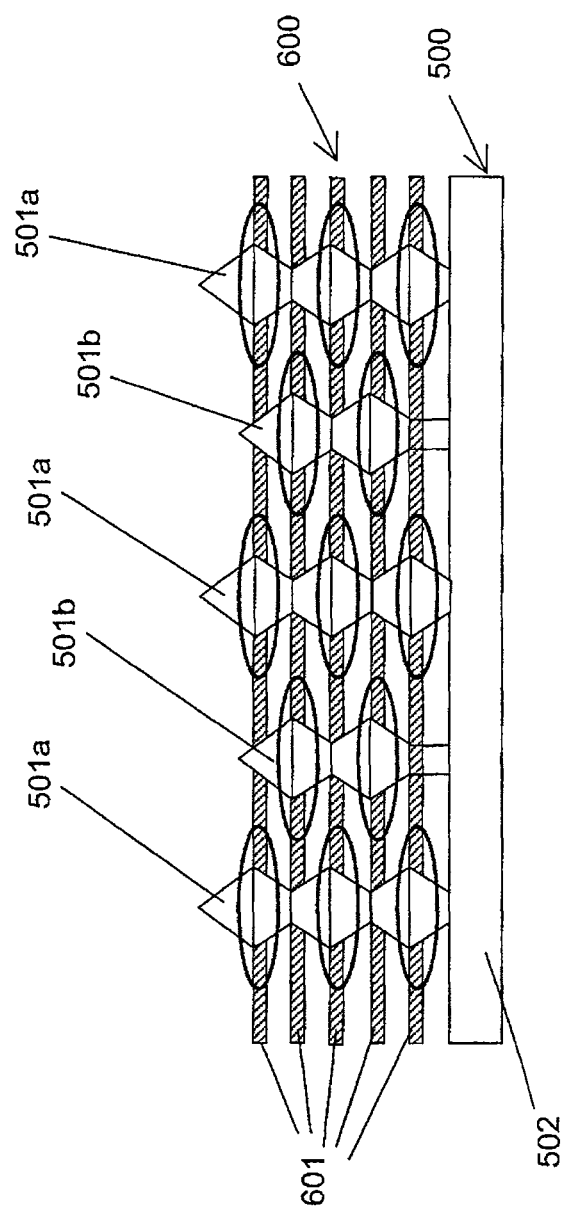
FIG. 5 illustrates a cross section view of a hybrid joint according to a second embodiment of the present invention.

FIG. 1 shows a prior art joint known as a Hybrid Penetrative database Reinforcement (HYPER) joint between a metallic or thermoplastic component 100 having an array of projections 101,101 . . . and a laminate composite component 200. The array of projections 101,101 . . . are formed on a bond surface 102 of the metallic or thermoplastic component 100 and are embedded in several laminate plies 201 of the composite component 200. The embedded projections 101, 101 . . . significantly enhance the strength of the joint when it is subjected to tensile, peel or cleavage loads.

Each projection 101 has a conical tip, the frusto-conical base, and an inverted frusto-conical overhang. The overhang has an undercut edge which is inclined and faces towards the bond surface 102. The conical tip and the inverted frusto-conical overhang together form a "head" of the projection 101.

The prior art joint shown in FIG. 1 suffers the problem that since each projection 101 is identical and the projections in the array are closely packed, the joint can fail when subjected to tensile load "L" in the pull-off direction (i.e. perpendicular to the bond surface 102) by a net section failure of the laminate component 200. The laminate component 200 fails by de-lamination of plies 201 in a region around the heads of the projections 101,101 . . . FIG. 1 shows the failed joint. When subjected to load L in the pull-off direction, the prior art joint shown in FIG. 1 has stress concentration regions where the projections 5,5 . . . best mechanically engage with the plies 201 of the composite component 200. This is typically in the region around the projection heads due to the overhanging edge beneath the maximum head diameter.

FIG. 2a shows a partial cross section view of the HYPER joint of FIG. 1, taken through the plane A-A containing the ply 201 positioned at the maximum head diameter of the projections 101,101 . . . . The penetration area (white) of each projection head is "p" and the ply area prior to penetration by the projections is "A". FIG. 2b shows a partial view of the HYPER joint of FIG. 1, showing only the ply 201 positioned at the maximum head diameter of the projections 101, 101 . . . . The rings around each projection 101,101 . . . show the stress concentration regions in the composite component 200.

FIG. 3 shows a cross section view of a portion of a HYPER joint according to an embodiment of the present invention. An array of projections 5,5 . . . is formed extending from a bond surface 6 of a metallic floating rib foot component 1. Each projection 5 also has a conical tip, the frusto-conical base, and an inverted frusto-conical overhang. The overhang forms an overhanging undercut edge which is inclined and faces towards the bond surface 6. The conical tip and the inverted frusto-conical overhang together form a "head" of the projection.

Figure depicts the array of projections 5,5 . . . that includes a plurality of first projections (e.g., the shorter projections) and a plurality of second projections (e.g., the taller projections), where the first projections have first and second frusto-conical sections arranged back-to-back (e.g., referring to the two-dimensions of FIG. 3, respectively (i) the triangular portion of element 5 and (ii) the trapezoidal portion sharing a line thereof with the triangular portion of element 5), and the second projections have third and fourth frusto-conical sections arranged back-to-back (e.g., referring to the two-dimensions of FIG. 3, respectively (i) the triangular portion of element 5 and (ii) the trapezoidal portion sharing a line thereof with the triangular portion of element 5). As can be seen from FIG. 3, a height of a first area of adjacency between the first and second frusto-conical sections above component 1 is different than a height of a second area of adjacency between the third and fourth frusto-conical sections above component 1.

The projections 5,5 ... are embedded in several laminate plies of a composite wing cover component 18. Unlike the prior art hybrid joint shown in FIG. 1, the hybrid joint shown in FIG. 3 has projections 5 of varying height Z from the bond surface 6. The projections 5,5 ... penetrate through differing numbers of plies in the wing cover 18 depending on their height Z. In FIG. 3, two projection profiles are shown, one being taller than the other.

It has been found that varying the height of the projections, and in particular the height of the overhanging edges, increases the strength of the HYPER joint in the pull-off direction, without markedly affecting the performance of the joint under other load conditions, e.g. shear. The joint in accordance with the present invention reduces stress concentrations in the wing cover 18 by increasing the number of plies in the wing cover 18 which best mechanically engage with the projections 5,5 ..., and increasing the un-penetrated area (by the projections) of each of the plies involved in this mechanical engagement.

FIG. 4a shows a partial cross section view of the HYPER joint of FIG. 3, taken through the plane B-B containing the ply positioned at the maximum head diameter of the taller projections. This ply also contains the tip of the shorter projections. The penetration area (white) of each projection head is either "p" for the taller projections, or "t" (where t=0.25p) for the shorter projections. The ply area prior to penetration by the projections is "A". FIG. 4b shows a partial view of the HYPER joint of FIG. 3, showing only the ply positioned at the maximum head diameter of the taller projections. The rings around each projection 5,5 ... show the stress concentration regions in the wing cover 18.

Comparing FIGS. 2a/2b and 4a/4b, it has been found that the stress in the ply shown in FIGS. 4a/4b is significantly lower than the stress in the ply shown in FIGS. 2a/2b. Consider the case where each projection only transfers load into the ply positioned at the maximum head diameter of the projection. If the load transferred at each projection is "F", then:

|  | FIG. 2a/2b | FIG. 4a/4b |
|---|---|---|
| Load into ply = | 9F | 5F |
| Ply load transfer area = | A-9p | A-6p |
| Stress in ply = | 9F/(A-9p) | 5F/(A-6p) |

The stress in the ply shown in FIGS. 4a/4b is reduced when compared with that of FIGS. 2a/2b partly due to the reduced load being transferred into the ply, and partly due to the increased ply load transfer area (i.e. the area of the ply that can transfer load to an adjacent ply), as a result of the multiple projection height profiles.

It is to be noted that the projections 5,5 ... of FIG. 3 are each of identical width dimension and so the varying height Z affects the aspect ratio (i.e. the ratio of the projection height to its base area). The aspect ratio influences the stiffness of the projection and typically varies between approximately 2 and 6.

In the portion of the array shown in FIG. 3, the projections 5,5 ... are of two different heights Z and projections of each height are staggered alternately across the array. However, the projections in the array may have more than two different heights and projections of different heights may be arranged in the array so as to form a regular or irregular pattern of virtually any form. For example, in a line of the array, a pair of projections having a first height may be followed by a pair of projections of a second height and then a second pair of projections of the first height, and so on. Alternatively, where projections of three or more heights are provided, a line of the array may have projections of gradually increasing and then decreasing height so as to form alternating peaks and troughs of projection tips. Of course, the array is two-dimensional and so these patterns can be repeated in both dimensions of the array. Some or all of the projections may have more than one overhanging edge. Numerous other arrangements of projections of differing height will be appreciated by those skilled in the art.

FIG. 5 shows a cross section through an alternative HYPER joint in accordance with the present invention, which provides a stress optimised solution. The joint comprises a metallic or thermoplastic component 500 having an array of projections 501a, 501b formed on a bond surface 502 thereof. The projections 501a, 501b are embedded in several laminate plies 601 of a composite component 600. The projections comprise a set of projections 501a, 501a ... having a first projection profile, and a second set of projections 501b, 501b ... having a second projection profile. The projections 501a each have a series of frusto-cones arranged back-to-back to form three regions of increased diameter. The projections 501b each have a series of frusto-cones arranged back-to-back to form two regions of increased diameter. Beneath each region of increased diameter is an overhang portion having an overhanging edge. The projections 501a, 501b each have a conical tip.

The projections 501a,501b are arranged on the bond surface in a three-dimensional array of alternating profiles 501a, 501b, 501a, etc. Load is transferred from the projections into the plies 601 at the regions of increased diameter. The circled areas show the stress concentration regions in the joint. Where a plurality of regions of increased diameter are provided on each projection, arranged to transfer load into the surrounding plies, one of these regions of increased diameter will be responsible for transferring the majority of the load. This will be the case even when the regions of increased diameter are similar in profile. By arranging the projections 501a, 501b as shown in FIG. 5, the stress in each ply 601 can be managed by reducing the load transferred into each ply, and by increasing the ply load transfer area (i.e. the area of the ply that can transfer load to an adjacent ply).

The increased number of overhanging edges in the HYPER joint shown in FIG. 5 in comparison with the HYPER joint of FIGS. 4a and 4b reduces the load transferred into each ply, and so reduces yet further the stress in each ply so improving the tensile strength of the joint. However, the projections of the embodiment shown in FIG. 5 are more complex to manufacture.

It is not essential that the overall height Z of the projections in the array is variable where the projections have overhanging edges of differing heights. However, when tailoring the projections for improved tensile strength performance of the joint, it is preferable that all of the projections in the array are scalable in the axial direction so that the performance of the joint under other load conditions (e.g. shear) is not impaired. Accordingly, the height Z of the projections preferably varies with the height of the overhanging edges.

Figure 6:
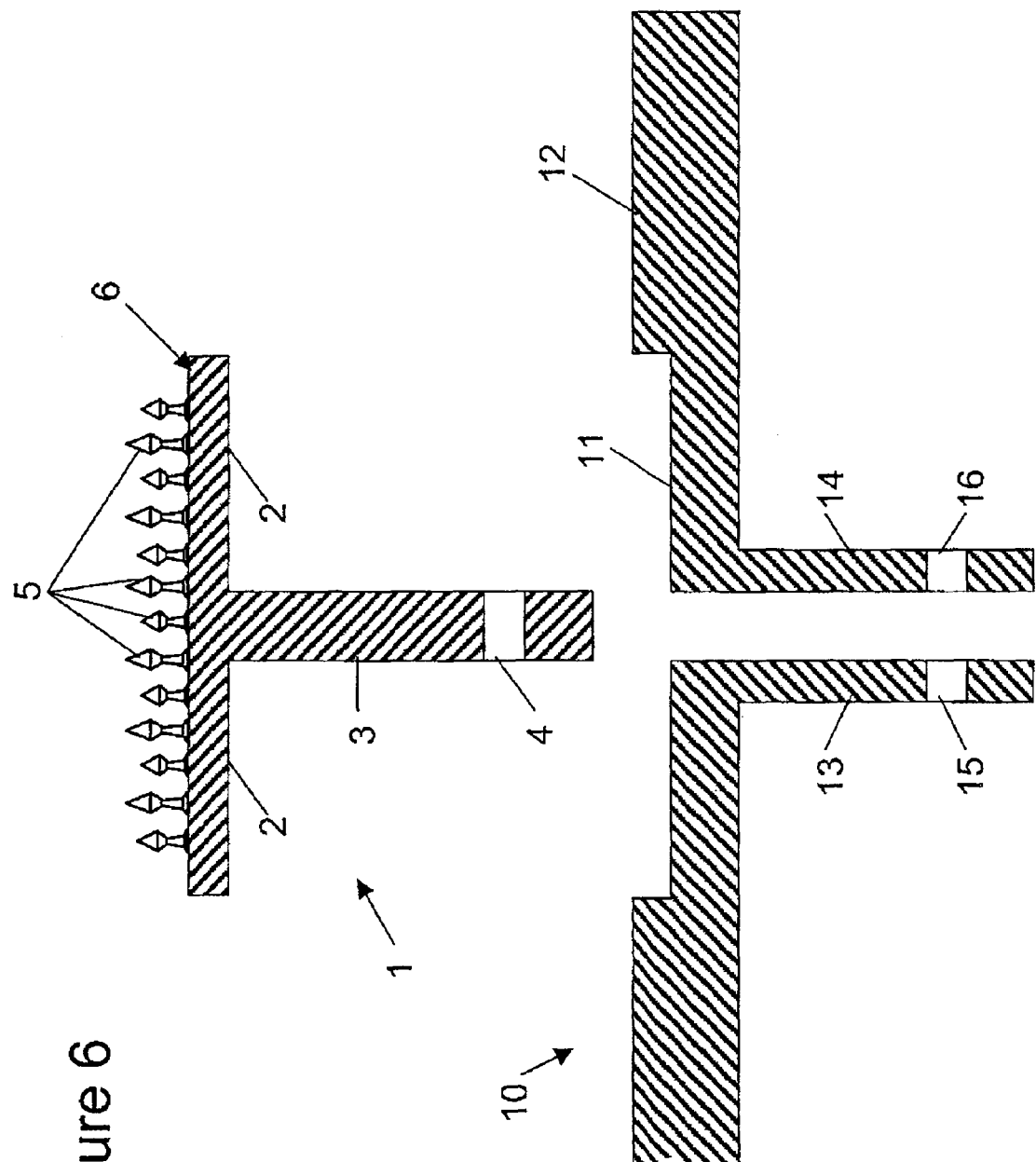
FIG. 6 illustrates a cross section view of a floating rib foot being integrated into a mould tool.

A method of forming the hybrid joint shown in FIG. 3 will now be described in detail. FIG. 6 shows a cross section of the whole metallic floating rib foot 1. The floating rib foot 1 comprises a downwardly extending web portion 3 and a pair of outwardly extending flanges 2. The web portion 3 has a pair of fastener holes 4 (one of which is shown in FIG. 6). The array of projections 5,5 . . . extend upwardly from a bond surface 6 of the flanges 2. The projections 5 are distributed around the periphery of the flanges 2 and surround a central region with no projections.

Figure 7:
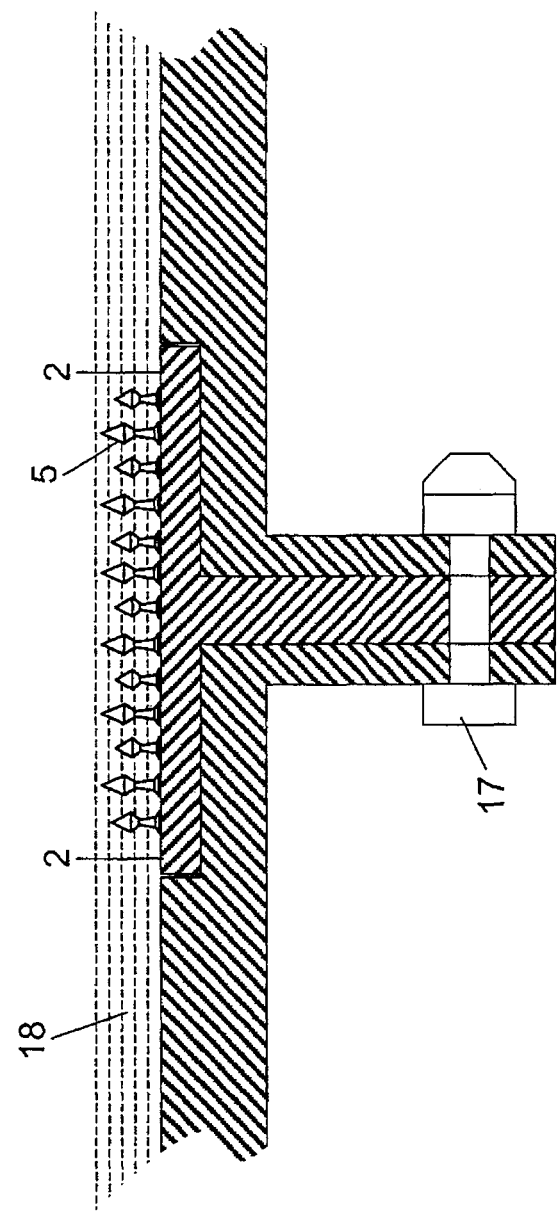
FIG. 7 illustrates a composite lay-up on the mould tool of FIG. 6.

The floating rib foot 1 is integrated into a mould tool 10. The mould tool 10 has a mould surface 12 with a recess 11 which receives the flanges 2 as shown in FIG. 7. Web portion 3 extends into a channel between a pair of plates 13, 14, and is secured in place by a fastener 17 passing through a pair of holes 15, 16 in the plates 13, 14 as shown in FIG. 7. In the example of FIG. 7 only one fastener 17 is shown, but in alternative arrangements two or more fasteners may be used to secure the floating rib foot to the mould tool. In the case where two fasteners are used, then they may be passed through the holes 4 in the web portion 3.

After the floating rib foot 1 has been integrated into the mould tool 10, a composite lay-up 18 is laid onto the mould tool. The composite lay-up 18 comprises a series of plies of uni-axial carbon fibre, pre-impregnated with uncured epoxy resin. Each ply is conventionally known as a "prepreg". The initial prepregs are penetrated by the projections 5 as shown in FIG. 7.

After the lay-up 18 has been formed as shown in FIG. 7, it is cured and consolidated by a so-called "vacuum bagging" process. That is, the lay-up is covered by a vacuum membrane (and optionally various other layers such as a breather layer or peel ply); the vacuum membrane is evacuated to apply consolidation pressure and extract moisture and volatiles; and the lay-up is heated (optionally in an autoclave) to cure the epoxy resin matrix. As the epoxy resin matrix melts prior to cure, it flows into intimate contact with the projections 5. The projections 5 mechanically engage with the matrix, while also increasing the surface area of the bond.

Figure 8:
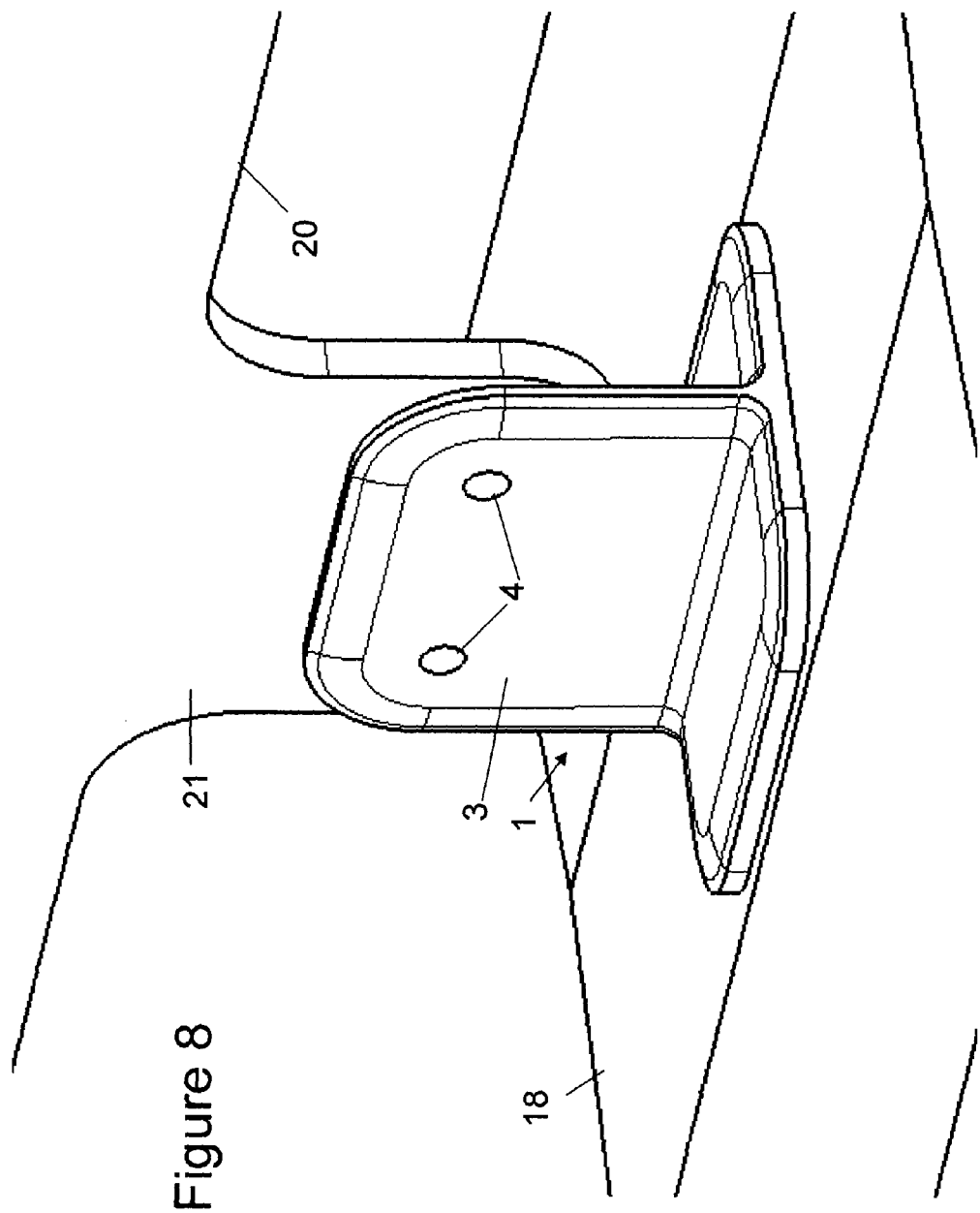
FIG. 8 illustrates a perspective view of the floating rib foot connecting a rib to a cover.

The components are then removed from the mould and assembled with various other wing box components as shown in FIG. 8. In this example the cured lay-up 18 is a wing cover, and the floating rib foot 1 secures a rib to the wing cover 18. The rib comprises a rib web 20 and a fixed rib foot 21 extending downwardly from the rib web 20. Fasteners (not shown) are passed through the fastening holes 4 in the web portion 3 of the floating rib foot 1 to secure the floating rib foot 1 to the fixed rib foot 20.

Figure 9:
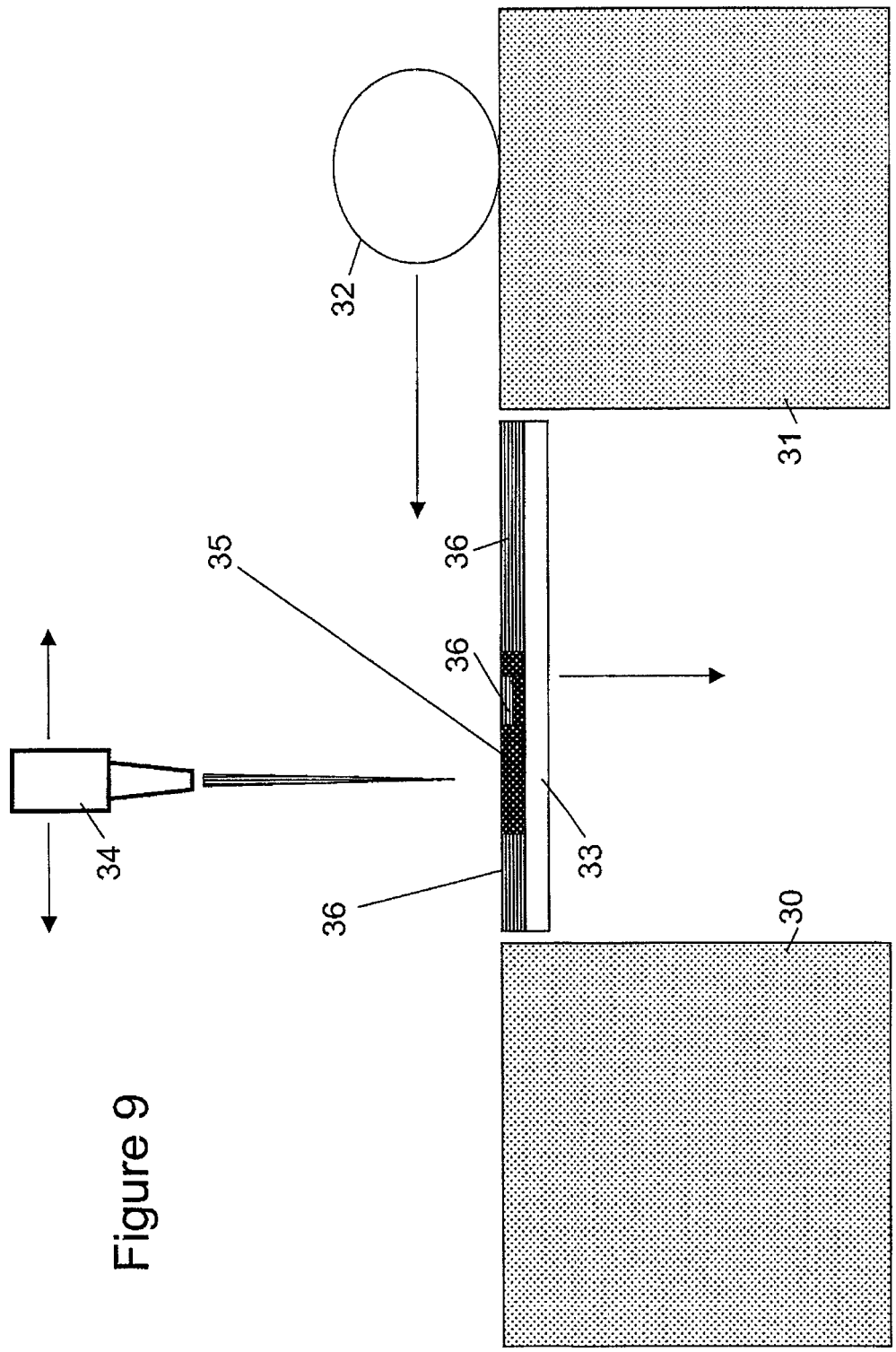
FIG. 9 illustrates a schematic view of a powder bed fabrication system.
Figure 10:
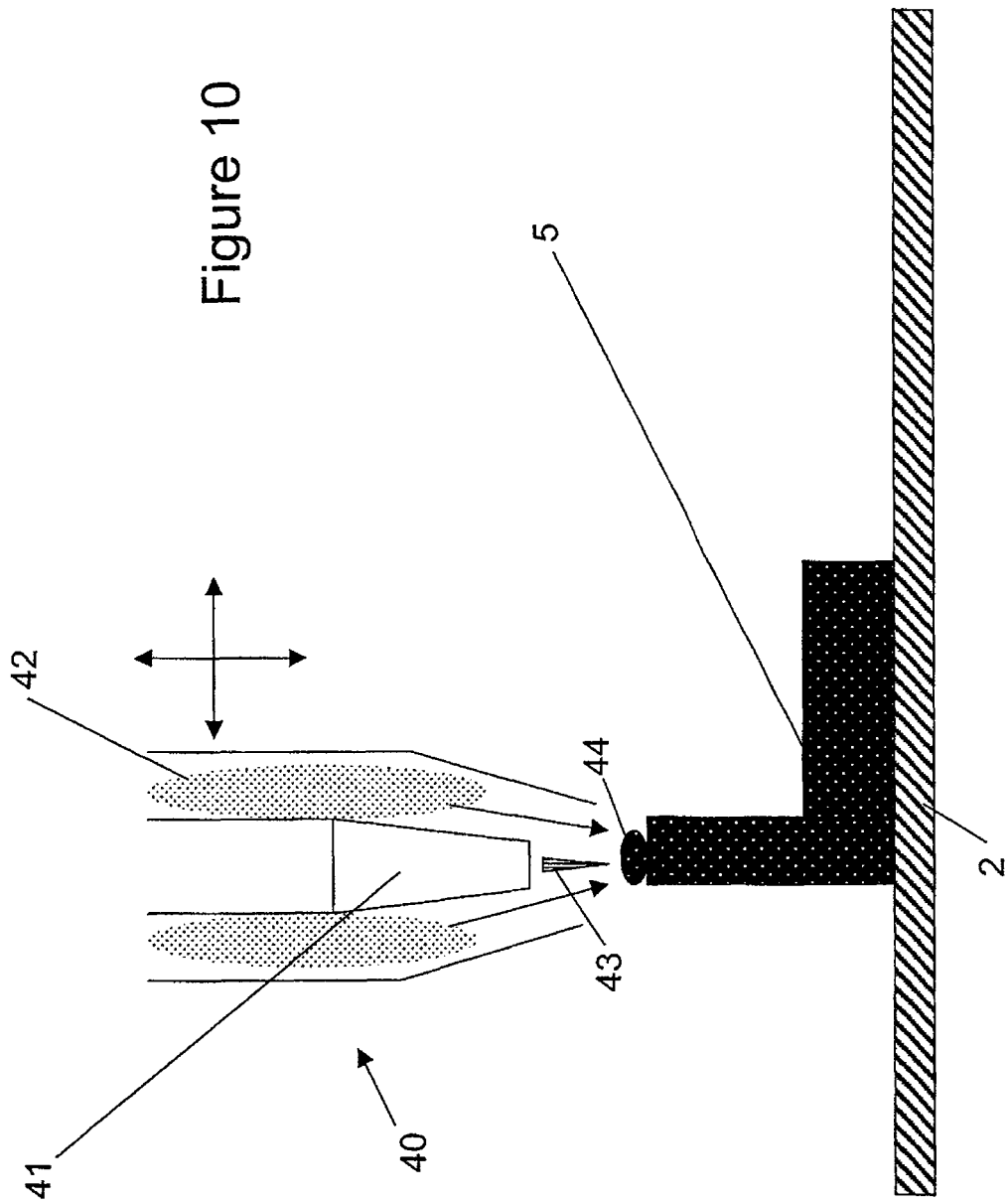
FIG. 10 illustrates a schematic view of a powder feed fabrication system.

Each projection 5 is grown on the bond surface 6 in a series of layers by an additive manufacturing process: either a powder bed process as shown in FIG. 9, or a powder feed process as shown in FIG. 10.

In the powder bed process shown in FIG. 9, the array of projections is formed by scanning a laser head laterally across a powder bed and directing the laser to selected parts of the powder bed. More specifically, the system comprises a pair of feed containers 30, 31 containing powdered metallic material such as powdered Titanium. A roller 32 picks up powder from one of the feed containers (in the example of FIG. 9, the roller 32 is picking up powder from the right hand feed container) and rolls a continuous bed of powder over a support member 33. A laser head 34 then scans over the powder bed, and a laser beam from the head is turned on and off to melt the powder in a desired pattern. The support member 33 then moves down by a small distance (typically of the order of 0.1 mm) to prepare for growth of the next layer. After a pause for the melted powder to solidify, the roller 32 proceeds to roll another layer of powder over support member 33 in preparation for sintering. Thus as the process proceeds, a sintered part 35 is constructed, supported by unconsolidated powder parts 36. After the part has been completed, it is removed from support member 33 and the unconsolidated powder 36 is recycled before being returned to the feed containers 30, 31.

The powder bed system of FIG. 9 can be used to construct the entire floating rib foot 1, including the web portion 3, flanges 2 and projections 5. Movement of the laser head 34 and modulation of the laser beam is determined by a Computer Aided Design (CAD) model of the desired profile and layout of the part.

The powder feed fabrication system shown in FIG. 10 can be used to build up the projections 5 on a previously manufactured floating rib foot. That is, the web portion 3 and flanges 2 have been previously manufactured before being mounted in the powder feed fabrication mechanism.

A projection 5 is shown being built up on the underside of one of the flanges 2 in FIG. 10. The powder feed fabrication system comprises a movable head 40 with a laser 41 and an annular channel 42 around the laser 41. Un-sintered powder flows through the channel 42 into the focus of the laser beam 43. As the powder is deposited, it melts to form a bead 44 which becomes consolidated with the existing material.

The powder feed system may be used to grow the projections in series, or in parallel. More specifically, the projections may be grown in parallel by the following sequence:
P(1)L(1), P(2)L(1), . . . P(n)L(1), P(1)L(2), P(2)L(2), . . . P(n)L(2) . . . etc.
or in series by the following sequence:
P(1)L(1), P(1)L(2), . . . P(1)L(m), P(2)L(1), P(2)L(2), . . . P(2)L(m) . . . etc.
where P(X)L(Y) represents the growth of a layer X of a projection Y.

This can be contrasted with the powder bed system which can only grow the projections in parallel.

In contrast to the powder bed system of FIG. 10, the powder feed system of FIG. 9 directs powder to only the selected parts of the bond region, and fuses the powder as it is delivered. Therefore the powder feed mechanism produces structures that are unsupported by powder, and so supports (not shown) may need to be built integrally into the part and machined off later, in particular where the projections have large overhanging parts.

The head 40 may be the only moving feature in the process, or the part may be rotated during fabrication. In other words, the head 40 directs powder to selected parts of the bond region with the part in a first orientation relative to the head 40; the part is rotated so that it adopts a second orientation relative to the head 40; and the head then directs material to selected parts of the bond region with the part in the second orientation. This facilitates the manufacturing of complex shapes without the need for removable supports. For instance overhanging features can be formed by rotating the part between layers in order to always ensure that the element being built is at no more than 30 degrees from the vertical. As the build area is at a temperature significantly below the melting point of the material, the area being built will only need to maintain a supportable angle for a brief time after the laser energy is removed in order for it to solidify enough to become self supporting. If the projections are built in a parallel sequence then it is possible to re-orientate the part between each layer to enable unsupported overhanging features to be built.

The laser source of either the powder bed or powder feed systems can be replaced by another power beam source, such as an electron beam source for directing an electron beam.

Whilst the projections 5 of this embodiment are rotationally symmetric about their centreline, and the centreline is linear and oriented perpendicularly to the bond surface 6, the projections may take many different forms within the scope of this invention. For example, the projections need not be rotationally symmetric and the conic sections of the base, tip and overhang may by replaced with pyramidal sections. The centreline need not be linear but may be curved. The centreline need not be oriented perpendicularly to the bond surface at the point of intersection, but instead the centreline may form an oblique angle with the bond surface at this intersection.

Although the invention has been described above with reference to one or more preferred embodiments, it will be appreciated that various changes or modifications may be made without departing from the scope of the invention as defined in the appended claims.

The invention claimed is:

1. A joint between a first component and a second component, wherein:
   the first component includes an array of projections formed extending from a bond surface thereof, the projections having a plurality of different profiles; and
   the second component includes a plurality of laminate plies laid over the bond surface of the first component, wherein
   the array of projections are embedded in the second component,
   each projection has a height, and
   each different projection profile has a different height such that the projections penetrate through differing numbers of the laminate plies depending on their height.

2. The joint according to claim 1, wherein each projection has at least one overhanging edge, and each different projection profile has its overhanging edge(s) at a different height with respect to the bond surface.

3. The joint according to claim 1, wherein the projections are arranged such that some adjacent projections have different profiles.

4. The joint according to claim 1, wherein the projections are arranged such that some adjacent projections have the same profile.

5. The joint according to claim 1, wherein the projections are arranged such that groups of projections form a repeating profile pattern on the bond surface.

6. The joint according to claim 1, wherein the projections are all of similar average width dimension.

7. The joint according to claim 1, wherein each projection is rotationally symmetric about its centerline.

8. The joint according to claim 1, wherein each projection has a pointed tip.

9. The joint according to claim 1, wherein each projection has a frustoconical base, a conical tip and an inverted frustoconical overhang between the base and the tip.

10. The joint according to claim 1, wherein the first component is metallic.

11. The joint according to claim 1, wherein the laminate plies are fibre reinforced composite plies.

12. The joint according to claim 1, wherein each different projection profile has an overhanging edge at a different height with respect to the bond surface.

13. The joint according to claim 1, wherein the laminate plies are laminate plies of a composite wing cover.

14. An aerospace structure, comprising:
   a fuselage including the joint of claim 1.

15. An aerospace structure, comprising:
   a wing including the joint of claim 1.

16. The joint of claim 1, wherein:
   the array of projections includes a plurality of first projections and a plurality of second projections,
   the first projections have first and second frusto-conical sections arranged back-to-back,
   the second projections have third and fourth frusto-conical sections arranged back-to-back, and
   a height of a first area of adjacency between the first and second frusto-conical sections above the first component is different than a height of a second area of adjacency between the third and fourth frusto-conical sections above the first component.

17. The joint according to claim 1, wherein the joint joins aerospace structural components.

18. A joint between a first component and a second component, wherein:
   the first component includes an array of projections formed extending from a bond surface thereof, the projections having a plurality of different profiles; and
   the second component includes a plurality of laminate plies laid over the bond surface of the first component, wherein
   the array of projections are embedded in the second component,
   each projection has an overhanging edge, and
   each different projection profile has its overhanging edge at a different height with respect to the bond surface.

19. The joint according to claim 18, wherein each different projection profile has a different height with respect to the bond surface.

20. The joint according to claim 18, wherein the projections are arranged such that some adjacent projections have different profiles.

21. The joint according to claim 18, wherein the projections are arranged such that some adjacent projections have the same profile.

22. The joint according to claim 18, wherein the projections are arranged such that groups of projections form a repeating profile pattern on the bond surface.

23. The joint according to claim 18, wherein the projections are all of similar average width dimension.

24. The joint according to claim 18, wherein each projection is rotationally symmetric about its centerline.

25. The joint according to claim 18, wherein each projection has a pointed tip.

26. The joint according to claim 18, wherein each projection has a frustoconical base, a conical tip and an inverted frustoconical overhang between the base and the tip.

27. The joint according to claim 18, wherein the first component is metallic.

28. The joint according to claim 18, wherein the laminate plies are fibre reinforced composite plies.

29. The joint according to claim 18, wherein the laminate plies are laminate plies of a composite wing cover.

30. The joint according to claim 18, wherein the joint joins aerospace structural components.

31. The joint of claim 18, wherein:
   the array of projections includes a plurality of first projections and a plurality of second projections,
   the first projections have first and second frusto-conical sections arranged back-to-back, the second projections have third and fourth frusto-conical sections arranged back-to-back, and a height of a first area of adjacency between the first and second frusto-conical sections above the first component is different than a height of a second area of adjacency between the third and fourth frusto-conical sections above the first component.

* * * * *